United States Patent
Lee

(10) Patent No.: US 9,386,317 B2
(45) Date of Patent: Jul. 5, 2016

(54) ADAPTIVE PICTURE SECTION ENCODING MODE DECISION CONTROL

(71) Applicant: Sony Computer Entertainment Inc., Tokyo (JP)

(72) Inventor: Hung-Ju Lee, Pleasanton, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 2 days.

(21) Appl. No.: 14/493,238

(22) Filed: Sep. 22, 2014

(65) Prior Publication Data

US 2016/0088299 A1 Mar. 24, 2016

(51) Int. Cl.
- *G06K 9/00* (2006.01)
- *H04N 19/124* (2014.01)
- *H04N 19/172* (2014.01)
- *H04N 19/196* (2014.01)

(52) U.S. Cl.
CPC ........... *H04N 19/124* (2014.11); *H04N 19/172* (2014.11); *H04N 19/197* (2014.11)

(58) Field of Classification Search
CPC ... H04N 19/61; H04N 19/107; H04N 19/159; H04N 19/147; H04N 19/19
See application file for complete search history.

(56) References Cited

U.S. PATENT DOCUMENTS

| | | | |
|---|---|---|---|
| 6,463,101 B1 | 10/2002 | Koto | |
| 7,321,621 B2 | 1/2008 | Popescu et al. | |
| 7,848,428 B2 | 12/2010 | Chin | |
| 8,032,520 B2 | 10/2011 | Dipper et al. | |
| 8,213,518 B1 | 7/2012 | Wang et al. | |
| 8,218,640 B2 | 7/2012 | Wang | |
| 8,218,641 B2 | 7/2012 | Wang | |
| 8,345,750 B2 | 1/2013 | Lee | |
| 8,711,933 B2 | 4/2014 | Lee | |
| 8,879,623 B2 | 11/2014 | Lee | |
| 8,913,664 B2 | 12/2014 | Lee | |
| 2004/0086193 A1 | 5/2004 | Kameyama et al. | |
| 2005/0147375 A1 | 7/2005 | Kadono | |
| 2005/0169371 A1* | 8/2005 | Lee | H04N 19/105 375/240.03 |
| 2005/0265461 A1 | 12/2005 | Raveendran | |

(Continued)

OTHER PUBLICATIONS

Cell Broadband Engine Architecture, downloaded from the internet: http://www-306.ibm.com/chips/techlib/techlib.nsf/techdocs/1AEEE1270EA2776387257060006E61BA/$file/CBEA_01_pub.pdf, dated Aug. 8, 2005.

(Continued)

*Primary Examiner* — Phuoc Tran
(74) *Attorney, Agent, or Firm* — Joshua D. Isenberg; JDI Patent

(57) ABSTRACT

A cost function for use in an encoding mode decision for encoding a section of a digital picture is determined using a non-default relationship between Lagrange multiplier ($\lambda$) values and quantization parameter (QP) values to determine the cost function when a number of bits per section (NBS) of the digital picture is in a predetermined range and determined using a default relationship between the $\lambda$ values and the QP values to determine the cost function otherwise. The determined cost function is used to make the section encoding mode decision and the section is encoded according to the encoding mode decision. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

26 Claims, 8 Drawing Sheets

(56) References Cited

U.S. PATENT DOCUMENTS

| | | | |
|---|---|---|---|
| 2007/0025621 A1 | 2/2007 | Lee et al. | |
| 2007/0297505 A1 | 12/2007 | Fidler et al. | |
| 2008/0025397 A1 | 1/2008 | Zhao et al. | |
| 2009/0003441 A1 | 1/2009 | Sekiguchi et al. | |
| 2009/0003447 A1 | 1/2009 | Christoffersen et al. | |
| 2009/0003448 A1 | 1/2009 | Sekiguchi et al. | |
| 2011/0122942 A1* | 5/2011 | Kudana | H04N 19/00175 375/240.03 |
| 2014/0233640 A1 | 8/2014 | Lee | |

OTHER PUBLICATIONS

Final Office Action for U.S. Appl. No. 12/853,214, dated Sep. 18, 2013.

ISO/IEC 14496-10:2009, "Information technology—Coding of audio-visual objects—Part 10: Advanced Video Coding, Edition 5" May 13, 2009, Downloaded from the internet: http://www.iso.org/iso/iso_catalogue/catalogue_tc/catalogue_detail.htm?csnumber=52974.

Liao, J.Y.; Villasenor, J., "Adaptive intra block update for robust transmission of H.263" IEEE Transactions on Circuits and Systems for Video Technology, vol. 10, Issue 1, Date: Feb 2000, pp. 30-35.

Nageswara Rao, G.; Gupta, P.S.S.K., "Improved Intra Prediction for Efficient Packetization in H.264 with Multiple Slice Groups", 2007 IEEE International Conference on Multimedia and Expo, Date: Jul. 2-5, 2007, pp. 1607-1610.

Non-Final Office Action for U.S. Appl. No. 12/853,214, dated Jun. 3, 2013.

Non-Final Office Action for U.S. Appl. No. 12/853,214, dated Sep. 5, 2012.

Non-Final Office Action for U.S. Appl. No. 14/263,882, dated Oct. 22, 2014.

Nunes, P.; Soares, L.D.; Pereira, F., "Error resilient macroblock rate control for H.264/AVC video coding" 15th IEEE International Conference on Image Processing, 2008. ICIP 2008. Date: Oct. 12-15, 2008, pp. 2132-2135.

Renxiang Li; Bing Zheng; Liou, M.L., "Reliable motion detection/compensation for interlaced sequences and its applications to deinterlacing" IEEE Transactions on Circuits and Systems for Video Technology, vol. 10, Issue 1, Date: Feb 2000, pp. 23-29.

Telecommunication Standardization Sector of ITU, International Telecommunication Union, Apr. 2013.

Tien Huu Vu; Aramvith, S., "An error resilience technique based on FMO and error propagation for H.264 video coding in error-prone channels" IEEE International Conference on Multimedia and Expo, 2009. ICME 2009. Date: Jun. 28-Jul. 3, 2009, pp. 205-208.

U.S. Appl. No. 14/503,158, to Hung-Ju Lee, filed Sep. 30, 2014.

U.S. Appl. No. 14/529,395, to Hung-Ju Lee, filed Oct. 31, 2014.

U.S. Appl. No. 62/057,112, to Hung-Ju Lee, filed Sep. 29, 2014.

U.S. Appl. No. 60/823,620, to Xun Xu, filed Aug. 25, 2006.

U.S. Appl. No. 60/863,767, to Jason N. Wang, filed Oct. 31, 2006.

Vetro, A.; Peng Yin; Bede Liu; Huifang Sun, "Reduced spatio-temporal transcoding using an intra refresh technique" IEEE International Symposium on Circuits and Systems, 2002. ISCAS 2002. vol. 4, Date: 2002, pp. IV-723-IV-726 vol. 4.

Wen-Nung Lie; Han-Ching Yeh; Zhi-Wei Gao; Ping-Chang Jui, "Error-Resilience Transcoding of H.264/AVC Compressed Videos" IEEE International Symposium on Circuits and Systems, 2007. ISCAS 2007. Date: May 27-30, 2007, pp. 1509-1512

Worrall, S.T.; Sadka, A.H.; Sweeney, P.; Kondoz, A.M., "Motion adaptive error resilient encoding for MPEG-4" Proceedings. (ICASSP '01). 2001 IEEE International Conference on Acoustics, Speech, and Signal Processing, 2001. vol. 3, Date: 2001, pp. 1389-1392 vol. 3.

Yu-Kuang Tu*, Jar-Ferr Yang*, and Ming-Ting Sun, An Efficient Criterion for Mode Decision in H.264/AVC, 2006.

Zhang, R.; Regunathan, S.L.; Rose, K., "Video coding with optimal inter/intra-mode switching for packet loss resilience" IEEE Journal on Selected Areas in Communications, vol. 18, Issue 6, Date: Jun. 2000, pp. 966-976.

Zhenyu Wu; Boyce, J.M., "Optimal Frame Selection for H.264/AVC FMO Coding" 2006 IEEE International Conference on Image Processing, Date: Oct. 8-11, 2006, pp. 825-828.

Final Office Action for U.S. Appl. No. 14/263,882, dated Apr. 28, 2015.

* cited by examiner

ADAPTIVE PICTURE SECTION ENCODING MODE DECISION CONTROL

FIELD OF THE DISCLSOURE

Aspects of the present disclosure are related to encoding of digital data. In particular, the present disclosure is related to picture section encoding mode decision.

BACKGROUND

Digital signal compression (sometimes referred to as video coding or video encoding) is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; AVC (H.264), and HEVC (H.265). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Aspects of the present disclosure are directed to solutions to the problem of improper encoding mode decision during coding of streaming data, especially for high bitrate video streaming and gaming streaming applications. An improper mode decision can trigger an unnecessary insertion of a non-predictive frame, e.g., an Intra Frame, or Instantaneous Decode Refresh (IDR) frame, which causes large and frequent spikes of bit rate usage. This is particularly problematic in a bandwidth-limited communication channel, a common situation, e.g., in online video gaming.

Before describing solutions to the problem of improper picture section encoding mode decision in accordance with aspects of the present disclosure, it is useful to understand how digital pictures, e.g., video pictures are encoded for streaming applications. Furthermore, it is useful to understand how encoded streaming digital picture data is decoded, since the manner in which a picture or portion of a picture is encoded affects how it is to be decoded.

Figure 1:
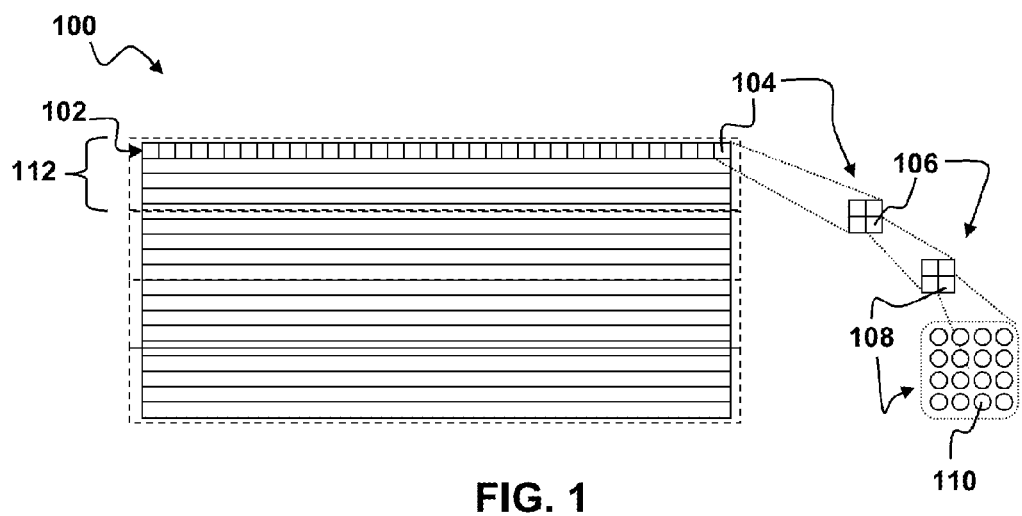
FIG. 1 is a schematic diagram illustrating one possible division of a streaming data picture within the context of aspects of the present disclosure.

By way of example, and not by way of limitation, as shown in FIG. 1, a single picture 100 (e.g., a digital video frame) may be broken down into one or more sections. As used herein, the term "section" can refer to a group of one or more pixels within the picture 100. A section can range from a single pixel within the picture, up to the whole picture. Non-limiting examples of sections include slices (e.g., macroblock rows) 102, macroblocks 104, sub-macroblocks 106, blocks 108 and individual pixels 110. As illustrated in FIG. 1, each slice 102 contains one or more rows of macroblocks 104 or portions of one or more such rows. The number of macroblocks in a row depends on the size of the macroblocks and the size and resolution of the picture 100. For example, if each macroblock contains sixteen by sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each macroblock 104 may be broken down into four sub-macroblocks 106. Each sub-macroblock may be broken down into four blocks 108 and each block may contain a four by four arrangement of sixteen pixels 110. Some codecs, such as H.265, allow a given picture to be broken down into two or more sections of different sizes for encoding. In particular, the H.265 standard introduces the "tile" concept of partitioning a picture. Tiles are independently decodable regions of a picture that are encoded with some shared header information. Tiles can additionally be used for the purpose of spatial random access to local regions of video pictures. A typical tile configuration of a picture consists of segmenting the picture into rectangular regions with approximately equal numbers of coding units (CUs) in each tile. A coding unit is analogous to a macroblock (MB) in the H.264 standard. However, the size of the CU can be set by the encoder, and can be larger than a macroblock. The size of the CU can be flexible and adaptive to video content for best partitioning of the picture.

It is noted that each picture may be either a frame or a field. A frame refers to a complete image. A field is a portion of an image used for to facilitate displaying the image on certain types of display devices. Generally, the pixels in an image are arranged in rows. To facilitate display an image may sometimes be split by putting alternate rows of pixels into two different fields. The rows of pixels in the two fields can then be interlaced to form the complete image. For some display devices, such as cathode ray tube (CRT) displays, the two fields may simply be displayed one after the other in rapid succession. The afterglow of the phosphors or other light emitting elements used to illuminate the pixels in the display combined with the persistence of vision results in the two fields being perceived as a continuous image. For certain display devices, such as liquid crystal displays, it may be necessary to interlace the two fields into a single picture before being displayed. Streaming data representing encoded images typically includes information indicating whether the image is a field or a frame. Such information may be included in a header to the image.

Modern video coder/decoders (codecs), such as MPEG2, MPEG4 and H.264 generally encode video frames as one of three basic types known as Intra-Frames, Predictive Frames and Bipredicitve Frames, which are typically referred to as I-frames, P-frames and B-frames respectively.

An I-frame is a picture coded without reference to any picture except itself. I-frames are used for random access and are used as references for the decoding of other P-frames or B-frames. I-frames may be generated by an encoder to create random access points (to allow a decoder to start decoding properly from scratch at a given picture location). I-frames may be generated when differentiating image details prohibit generation of effective P or B frames. Because an I-frame contains a complete picture, I-frames typically require more bits to encode than P-frames or B-frames. Video frames are often encoded as I-frames when a scene change is detected in the input video.

P-frames require the prior decoding of some other picture(s) in order to be decoded. P-frames typically require fewer bits for encoding than I-frames. A P-frame contains encoded information regarding differences relative to a previous I-frame in decoding order. A P-frame typically references the preceding I-frame in a Group of Pictures (GoP). P-frames may contain both image data and motion vector displacements and combinations of the two. In some standard codecs (such as MPEG-2), P-frames use only one previously-decoded picture as a reference during decoding, and require that picture to also precede the P-frame in display order. In H.264, P-frames can use multiple previously-decoded pictures as references during decoding, and can have any arbitrary display-order relationship relative to the picture(s) used for its prediction.

B-frames require the prior decoding of either an I-frame or a P-frame in order to be decoded. Like P-frames, B-frames may contain both image data and motion vector displacements and/or combinations of the two. B-frames may include some prediction modes that form a prediction of a motion region (e.g., a segment of a frame such as a macroblock or a smaller area) by averaging the predictions obtained using two different previously-decoded reference regions. In some codecs (such as MPEG-2), B-frames are never used as references for the prediction of other pictures. As a result, a lower quality encoding (resulting in the use of fewer bits than would otherwise be used) can be used for such B pictures because the loss of detail will not harm the prediction quality for subsequent pictures. In other codecs, such as H.264, B-frames may or may not be used as references for the decoding of other pictures (at the discretion of the encoder). Some codecs (such as MPEG-2), use exactly two previously-decoded pictures as references during decoding, and require one of those pictures to precede the B-frame picture in display order and the other one to follow it. In other codecs, such as H.264, a B-frame can use one, two, or more than two previously-decoded pictures as references during decoding, and can have any arbitrary display-order relationship relative to the picture(s) used for its prediction. B-frames typically require fewer bits for encoding than either I-frames or P-frames.

As used herein, the terms I-frame, B-frame and P-frame may be applied to any streaming data units that have similar properties to I-frames, B-frames and P-frames, e.g., as described above with respect to the context of streaming video.

Figure 2A:
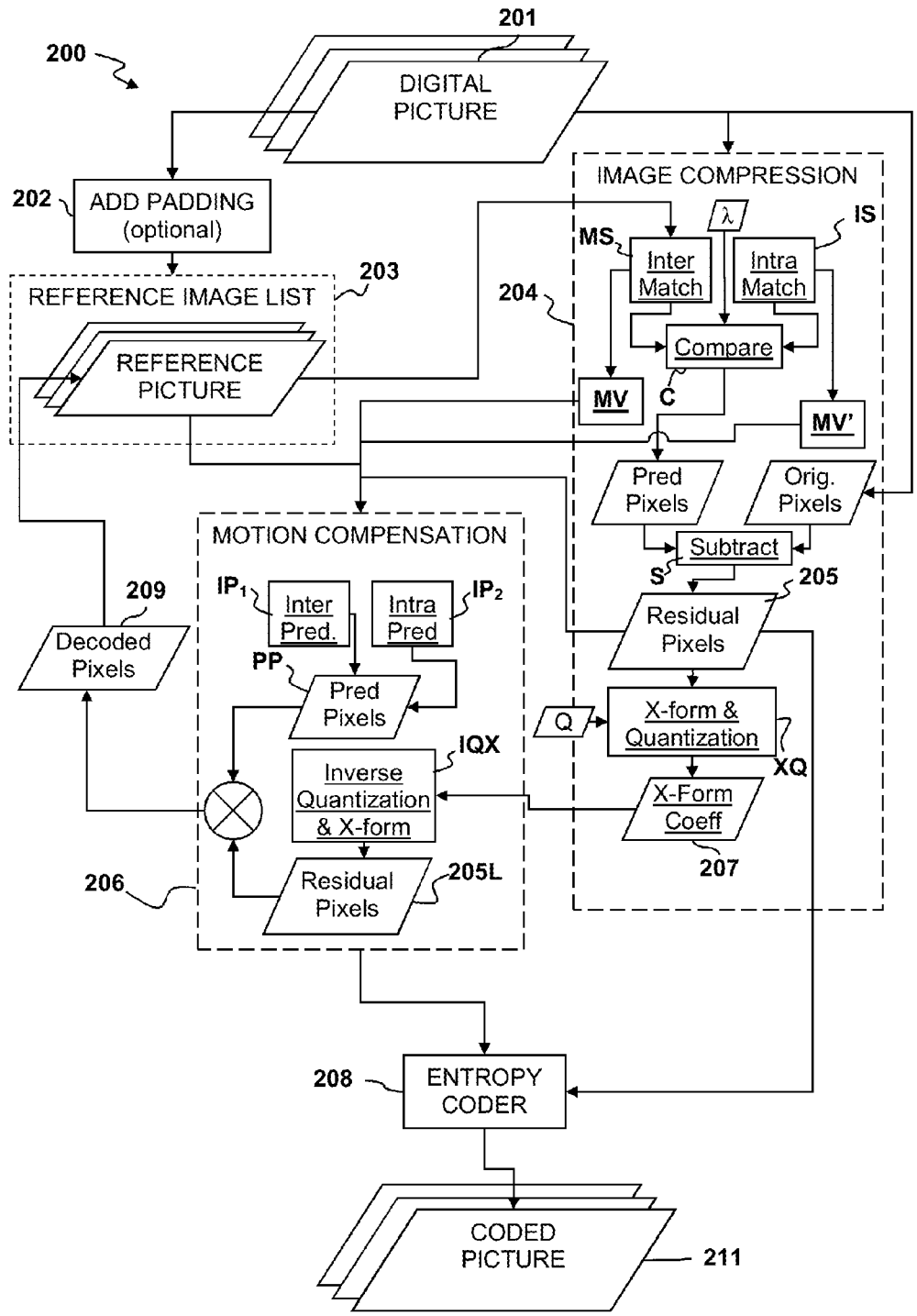
FIG. 2A is a flow diagram illustrating digital picture encoding that may be used in conjunction with aspects of the present disclosure.

By way of example, and not by way of limitation, digital pictures may be encoded according to a generalized method 200 as illustrated in FIG. 2A. The encoder receives a plurality of digital images 201 and encodes each image. Encoding of the digital picture 201 may proceed on a section-by-section basis. The encoding process for each section may optionally involve padding 202, image compression 204 and motion compensation 206. To facilitate a common process flow for both intra-coded and inter-coded pictures, all un-decoded pixels within a currently processing picture 201 may be padded with temporary pixel values to produce a padded picture, as indicated at 202. The padding may proceed, e.g., as described above in U.S. Pat. No. 8,711,933, which is incorporated herein by reference. The padded picture may be added to a list of reference pictures 203 stored in a buffer. Padding the picture at 202 facilitates the use of a currently-processing picture as a reference picture in subsequent processing during image compression 204 and motion compensation 206. Such padding is described in detail in commonly-assigned U.S. Pat. No. 8,218,641, which is incorporated herein by reference.

As used herein, image compression refers to the application of data compression to digital images. The objective of the image compression 204 is to reduce redundancy of the image data for a give image 201 in order to be able to store or transmit the data for that image in an efficient form of compressed data. The image compression 204 may be lossy or lossless. Lossless compression is sometimes preferred for artificial images such as technical drawings, icons or comics. This is because lossy compression methods, especially when used at low bit rates, introduce compression artifacts. Lossless compression methods may also be preferred for high value content, such as medical imagery or image scans made for archival purposes. Lossy methods are especially suitable for natural images such as photos in applications where minor (sometimes imperceptible) loss of fidelity is acceptable to achieve a substantial reduction in bit rate.

Examples of methods for lossless image compression include, but are not limited to Run-length encoding—used as default method in PCX and as one of possible in BMP, TGA, TIFF, Entropy coding, adaptive dictionary algorithms such as LZW—used in GIF and TIFF and deflation—used in PNG, MNG and TIFF. Examples of methods for lossy compression include reducing the color space of a picture 201 to the most common colors in the image, Chroma subsampling, transform coding, and fractal compression.

In color space reduction, the selected colors may be specified in the color palette in the header of the compressed image. Each pixel just references the index of a color in the color palette. This method can be combined with dithering to avoid posterization. Chroma subsampling takes advantage of the fact that the eye perceives brightness more sharply than color, by dropping half or more of the chrominance information in the image. Transform coding is perhaps the most commonly used image compression method. Transform coding typically applies a Fourier-related transform such as a discrete cosine transform (DCT) or the wavelet transform, followed by quantization and entropy coding. Fractal compression relies on the fact that in certain images, parts of the image resemble other parts of the same image. Fractal algorithms convert these parts, or more precisely, geometric shapes into mathematical data called "fractal codes" which are used to recreate the encoded image.

The image compression 204 may include region of interest coding in which certain parts of the image 201 are encoded with higher quality than others. This can be combined with scalability, which involves encoding certain parts of an image first and others later. Compressed data can contain information about the image (sometimes referred to as meta information or metadata) which can be used to categorize, search or browse images. Such information can include color and texture statistics, small preview images and author/copyright information.

By way of example, and not by way of limitation, during image compression at 204 the encoder may search for the best way to compress a block of pixels. The encoder can search all of the reference pictures in the reference picture list 203, including the currently padded picture, for a good match. If the current picture (or subsection) is coded as an intra picture, (or subsection) only the padded picture is available in the reference list. The image compression at 204 produces a motion vector MV and transform coefficients 207 that are subsequently used along with one or more of the reference pictures (including the padded picture) during motion compensation at 206. Motion compensation refers to a technique for describing a picture in terms of the transformation of a reference image to a currently processing image.

The image compression 204 generally includes a motion search MS for a best inter prediction match, an intra search IS for a best intra prediction match, an inter/intra comparison C to decide whether the current macroblock is to be inter-coded or intra-coded, a subtraction S of the original input pixels from the section being encoded with best match predicted pixels to calculate lossless residual pixels 205. The residual pixels then undergo a transform and quantization XQ to produce transform coefficients 207. The transform is typically based on a Fourier transform, such as a discrete cosine transform (DCT).

The transform outputs a set of coefficients, each of which is a weighting value for a standard basis pattern. When combined, the weighted basis patterns re-create the block of residual samples. The output of the transform, a block of transform coefficients, is quantized, i.e. each coefficient is divided by an integer value. Quantization reduces the precision of the transform coefficients according to a quantization parameter (QP). Typically, the result is a block in which most or all of the coefficients are zero, with a few non-zero coefficients. Setting QP to a high value means that more coefficients are set to zero, resulting in high compression at the expense of poor decoded image quality. For a low QP value, more non-zero coefficients remain after quantization, resulting in better decoded image quality but lower compression. Conversely, for a high QP value, fewer non-zero coefficients remain after quantization, resulting in higher image compression but lower image quality.

The comparison C, also referred to as a mode decision uses a parameter known as a Lagrange multiplier $\lambda$ that is related to QP. Basically, a cost function J is computed using a value of $\lambda$ determined from the value of QP. The encoding mode is determined based on whether the computed cost function J for inter mode coding is above or below a computed cost for intra mode coding. By way of example, the H.264/AVC codec supports a cost function $J_H$, which should be minimized by computing the actual bit consumption R for encoding the overhead (e.g., motion vectors, types) of the section and the reconstruction distortion D (measured,e.g., as a sum of absolute differences, SAD between the original and reconstructed sections). In such a case, the cost function $J_H$ is computed according to $$J_H = D + \lambda \cdot R.$$

In alternative implementations, the distortion D may be calculated differently. There are many ways to represent the distortion, for example, sum of squared differences (SSD), sum of absolute transformed differences (SATD), mean absolute difference (MAD), and the like. Those skilled in the art will recognize that for different distortion measures, the cost function has to be modified or re-tuned accordingly.

Under some circumstances, an improper encoding mode decision can trigger an unnecessary IDR or I-frame insertion. Consider an example of steaming video during online video gaming. The encoder tries to meet a target bit rate for the video stream that is generated by a game application. The target bit rate is related to the number of bits per frame. If the game is paused, the video is essentially a stream of still frames. For a still frame, the QP is low in order to meet the target bits for the frame in rate distortion optimization process. When QP is low, the mode decision selects intra coding for most sections (e.g., macroblocks) in a still frame. If the number of intra-coded sections in a frame is above a threshold the codec triggers a scene-change detection and the next frame is coded as an intra frame with extremely low QP, which requires a large number of bits to encode. This is due to the fact that extremely low values of QP (e.g., QP=1, 2) implies nearly lossless coding in this case. By way of example, and not by way of limitation, the threshold for triggering scene change detection may be about 60-80% intra MB in a frame. A sequence of still frames causes in a sequence of scene change detections even though basically the same frame is being repeated. The sequence of intra-frames can cause large and frequent spikes of bit rate usage in a bandwidth-limited communication channel.

Normally relationship between $\lambda$ and QP is fixed by the codec and is the same for all pictures. According to aspects of the present disclosure, the relationship between $\lambda$ and QP can be adjusted from picture to picture depending on the number of bits per section in a picture.

According to aspects of the present disclosure, the relation between $\lambda$ and QP can be adapted based on the number of bits per section so that the encoding mode decision can be configured in a way that reduces the likelihood of unnecessary IDR or I-frame insertion.

According to aspects of the present disclosure, the relationship between $\lambda$ and QP may be selectively adjusted during encoding, e.g., at the beginning of encoding of a video stream or the beginning of each video frame in a stream in a way that makes it more likely for the section encoding mode decision to result in an "inter" coding decision instead of an "intra" coding mode.

In some implementations it is even possible to change the $\lambda$ versus QP relationship for each section if there are different size sections in a frame, e.g., as is possible in H.265. This could be beneficial, e.g., in two-pass encoding use cases since the first pass would provide more insight about the content of the picture sections so that better coding mode decisions can be made.

By way of example, and not by way of limitation, adjustment to the relationship between $\lambda$ and QP may depend on the number of bits in a section (NBS), which generally depends on the target bitrate (e.g., in bits per second), the frame rate (e.g., in frames per second), and the number of sections in a frame. The number of bits in a section NBS can be calculated by dividing the target bitrate BR by the product of the frame rate FR and the number of sections per frame NSF. By way of example, and not by way of limitation, this can be expressed as:

NBS=BR/(FR·NSF)

More generally, the number of bits per section (NBS) may be more broadly expressed as NBS=(BPF)/(NSF), where BPF is the target number of bits per frame.

This broadened expression allows for the possibility that the value of NBS could be different from frame to frame, depending, e.g., on the target bits allocated by the underlying rate control scheme. In the case of a fixed target number of bits for each frame BPF becomes BR/FR.

The number of sections (e.g., MB) per frame depends on the resolution. The change to the table can be triggered by a combination of resolution, frame rate, and bit rate. E.g., a table change would be triggered for a frame having 960 by 540 resolution, a frame rate of 30 fps, and a target rate of 8-10 Mbps or higher. For a given bitrate and frame rate a table change is less likely to be triggered if the resolution increases. For a given bitrate and resolution a table change is less likely to be triggered if the frame rate increases. For a given frame rate and resolution a table change is less likely to be triggered if the bitrate decreases.

The relationship between $\lambda$ and QP is typically nonlinear. Generally, when QP is high $\lambda$ is high and when QP is low $\lambda$ is low. For example, in the original settings used in the H264/AVC codec QP ranges from 0 to 51 and $\lambda$ is related to QP as follows:

$\lambda_0 = 2^{((QP-12)/6)}$ for QP=[12,51], and $\lambda_0 = 1$ for QP=[0, 12].

To increase the likelihood that the cost function for a given QP will produce an "inter" coding mode decision for a section, the relationship between $\lambda$ and QP can be adjusted to a non-default relationship in which some of the $\lambda$ values for certain QP values are higher than in the default relationship.

Some possible alternative relationships that are more likely to result in an "inter" encoding mode decision include the following:

$\lambda_1 = 1$ for QP=[0,11], $\lambda_1 = 2^{\hat{}}((20-12)/6) = 2.519842$, for QP=[12,19], and $\lambda_1 = 2^{\hat{}}((QP-12)/6)$, for QP=[20, 51]

$\lambda_2 = 1$ for QP=[0,11], $\lambda_2 = 2^{\hat{}}((22-12)/6) = 3.174802$, for QP=[12,21], and $\lambda_2 = 2^{\hat{}}((QP-12)/6)$, for QP=[22, 51]

$\lambda_3 = 1$ for QP=[0,11], $\lambda_3 = 2^{\hat{}}((24-12)/6) = 4$, for QP=[12, 23], and $\lambda_1 = 2^{\hat{}}((QP-12)/6)$, for QP=[24,51].

Other relationships between QP and $\lambda$ are possible. For example, in the MPEG-2 and MPEG-4 standards, QP ranges from 0 to 31. These particular standards do not have a relationship between $\lambda$ and QP. However, these standards may be modified to include one, e.g., for QP=[1 . . . 31], $\lambda_0 = 2^{((QP)/6)}$ may be used as the default relationship.

Figure 2B:
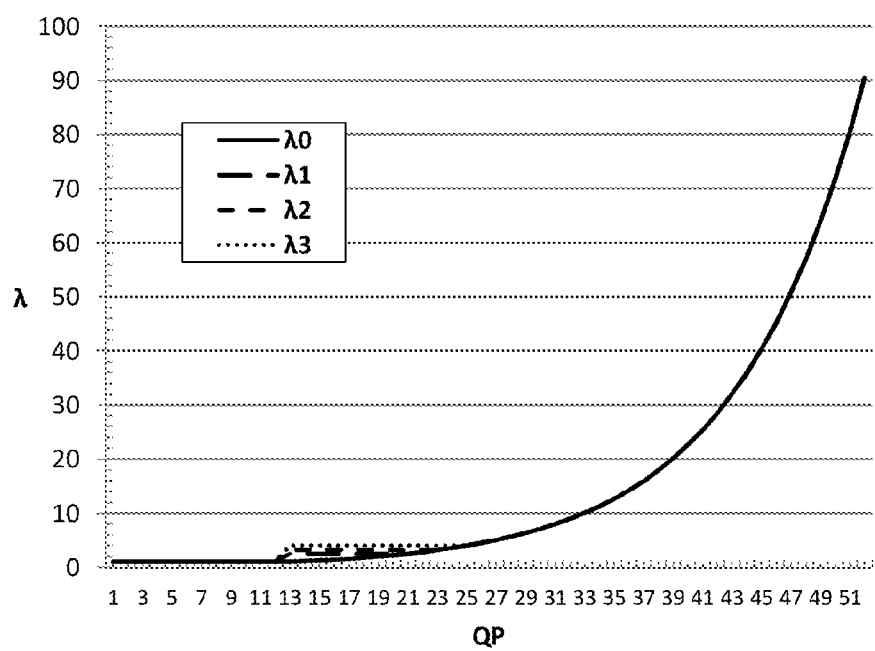
FIG. 2B is a graph depicting different examples of plots of Lagrange parameter ($\lambda$) as a function of quantization parameter (QP).

Graphical plots illustrating the relationships between QP and $\lambda_0, \lambda_1, \lambda_2,$ and $\lambda_3$ are shown in FIG. 2B.

Figure 2C:
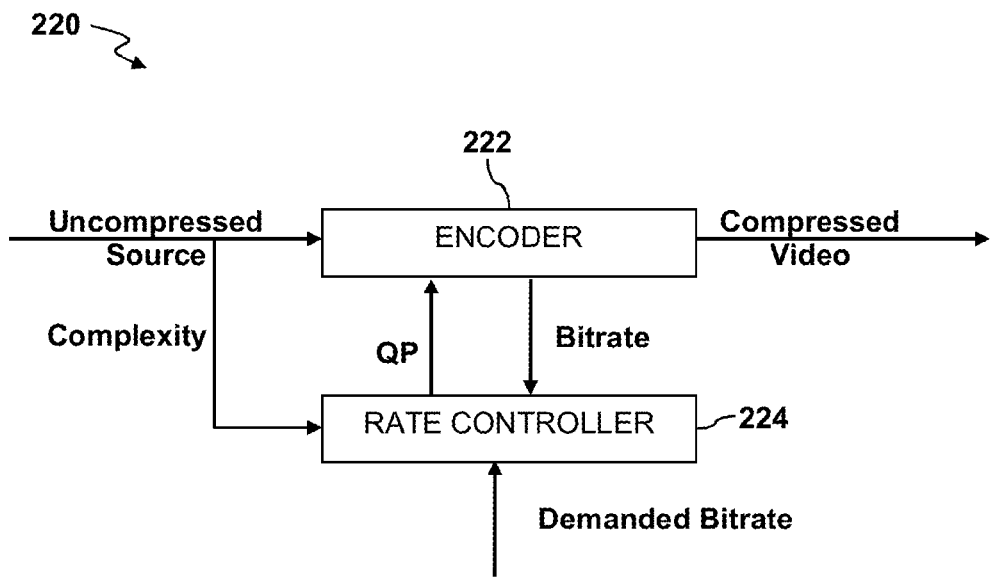
FIG. 2C is a block diagram illustrating a system having an encoder and rate controller that may be used in conjunction with aspects of the present disclosure.

The QP value can be adjusted depending on the target bitrate. Since QP controls bit usage in encoding, many encoding programs utilize a rate controller that adjusts QP in order to achieve a desired bitrate. The use of such a rate controller may be understood by referring to FIG. 2C and FIG. 2D. As seen in FIG. 2C, a video encoding system 220 may include an encoder 222 and a rate controller 224. The encoder receives uncompressed source data (e.g., an input video) and produces compressed output. The encoder 222 may be configured to implement the coding method 200 depicted in FIG. 2A. As noted above, the video coding method 200 uses a QP value that affects the bit usage for encoding a video section and therefore affects the bitrate. Generally, lower bit usage results in a higher bitrate. The rate controller 224 determines a QP value based on a demanded bitrate, which may be specified by an external application. The encoder 222 uses the QP value determined by the rate controller and determines the actual resulting bit usage and bit rate. The rate controller 224 can use the actual bit rate to adjust the QP value in a feedback loop.

Figure 2D:
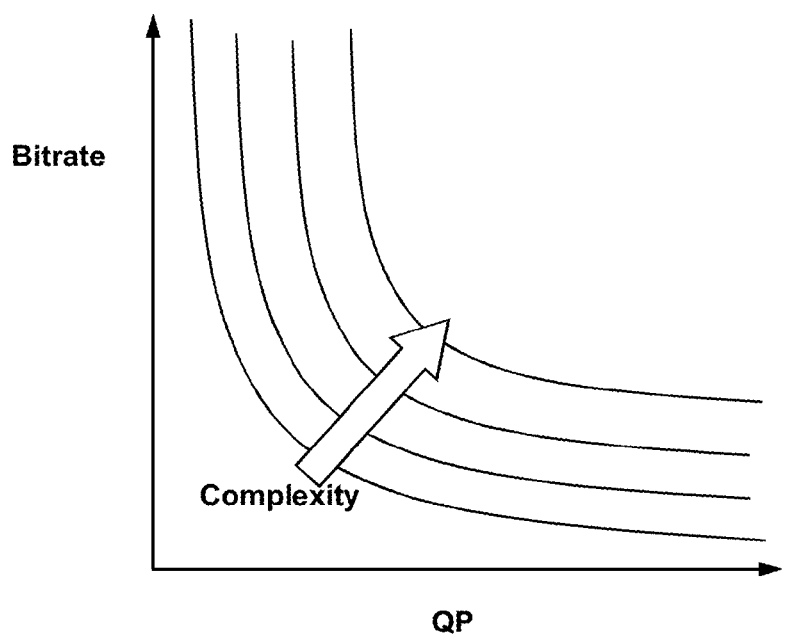
FIG. 2D is a graph illustrating a general relationship between bitrate, quantization parameter (QP) and complexity in a rate control algorithm that may be used in conjunction with aspects of the present disclosure.

The relationship between the bitrate and the value of the QP depends partly on the complexity of the image being encoded, as shown in FIG. 2D. The bitrate versus QP relationship can be expressed in terms of a set of curves with different curves for different levels of complexity. The heart of the algorithm implemented by the rate controller is a quantitative model describing a relationship between QP, actual bitrate and some measure of complexity, e.g., as depicted in FIG. 2D. The relevant bitrate and complexity are generally associated only with the differences between source pixels and predicted pixels (often referred to as residuals) because the quantization parameter QP can only influence the detail of information carried in the transformed residuals.

Complexity generally refers to amount of spatial variation within a picture or part of the picture. On a local level, e.g., block or macroblock level, the spatial variation may be measured by the variance of the pixel values within the relevant section. However, for a video sequence, complexity may also relate to the temporal variation of a scene of a sequence of images. For example, a video sequence consists of one object having substantial spatial variation that translates slowly across the field of view, may not require very many bits because temporal prediction can easily capture the motion using a single reference picture and a series of motion vectors. Although it is difficult to define an inclusive video complexity metric that is also easy to calculate, the Mean Average Difference (MAD) of the prediction error (difference between source pixel value and predicted pixel value) is often used for this purpose.

Motion search and prediction depend on the type of picture being encoded. Referring again to FIG. 2A, if an intra picture is to be coded, the motion search MS and inter/intra comparison C are turned off. However, if a padded picture is available as a reference, these functions do not have to be turned off and the image compression 204 may be the same for intra-coded pictures and inter-coded pictures. The motion search MS may generate a motion vector MV by searching the picture 201 for a best matching block or macroblock for motion compensation as is normally done for an inter-coded picture. If the current picture 201 is an intra-coded picture, by contrast, certain codecs typically do not allow prediction across pictures. Instead all motion compensation is normally turned off for an intra picture (e.g., I-frame) and the picture coded by generating transform coefficients and performing pixel prediction. In some implementations, an intra picture may be used to do inter prediction by matching a section in the current picture to another offset section within that same picture. The offset between the two sections may be coded as a motion vector MV' that can be used that for motion compensation at 206. For example, the encoder may attempt to match a block or macroblock in an intra picture with some other offset section in the same picture then code the offset between the two as a motion vector. The codec's ordinary motion vector compensation for an "inter" picture may then be used to do motion vector compensation on an "intra" picture. Certain codecs have functions that can convert an offset between two blocks or macroblocks into a motion vector, which can be followed to do motion compensation at 206. The codec may be instructed not to turn off such "inter" picture functions for encoding of intra pictures if padded pictures are available for reference.

In general, the motion compensation 206 acts as a local decoder within the encoder implementing the encoding process 200. Specifically, the motion compensation 206 includes inter prediction IP1 and (optionally) intra prediction IP2 to get predicted pixels PP using the motion vector MV or MV' from the image compression 204 and reference pixels from a picture in the reference list. Inverse quantization and inverse transformation IQX using the transform coefficients 207 from the image compression 204 produce lossy residual pixels 205L which are added to the predicted pixels PP to generate decoded pixels 209. The decoded pixels 209 are inserted into the reference picture and are available for use in image compression 204 and motion compensation 206 for a subsequent section of the currently-processing picture 201. After the decoded pixels have been inserted, un-decoded pixels in the reference picture may optionally undergo padding 202.

The result of the image compression 204 and motion compensation 206 and (optionally) entropy coding 208 is a set of data 211 referred to for convenience as a coded picture. The motion vector MV, (and/or intra prediction mode motion vector MV') and transform coefficients 207 may be included in the coded picture 211. Once a digital picture or other form of streaming data has been encoded, the encoded data may be transmitted and then decoded.

Figure 3:
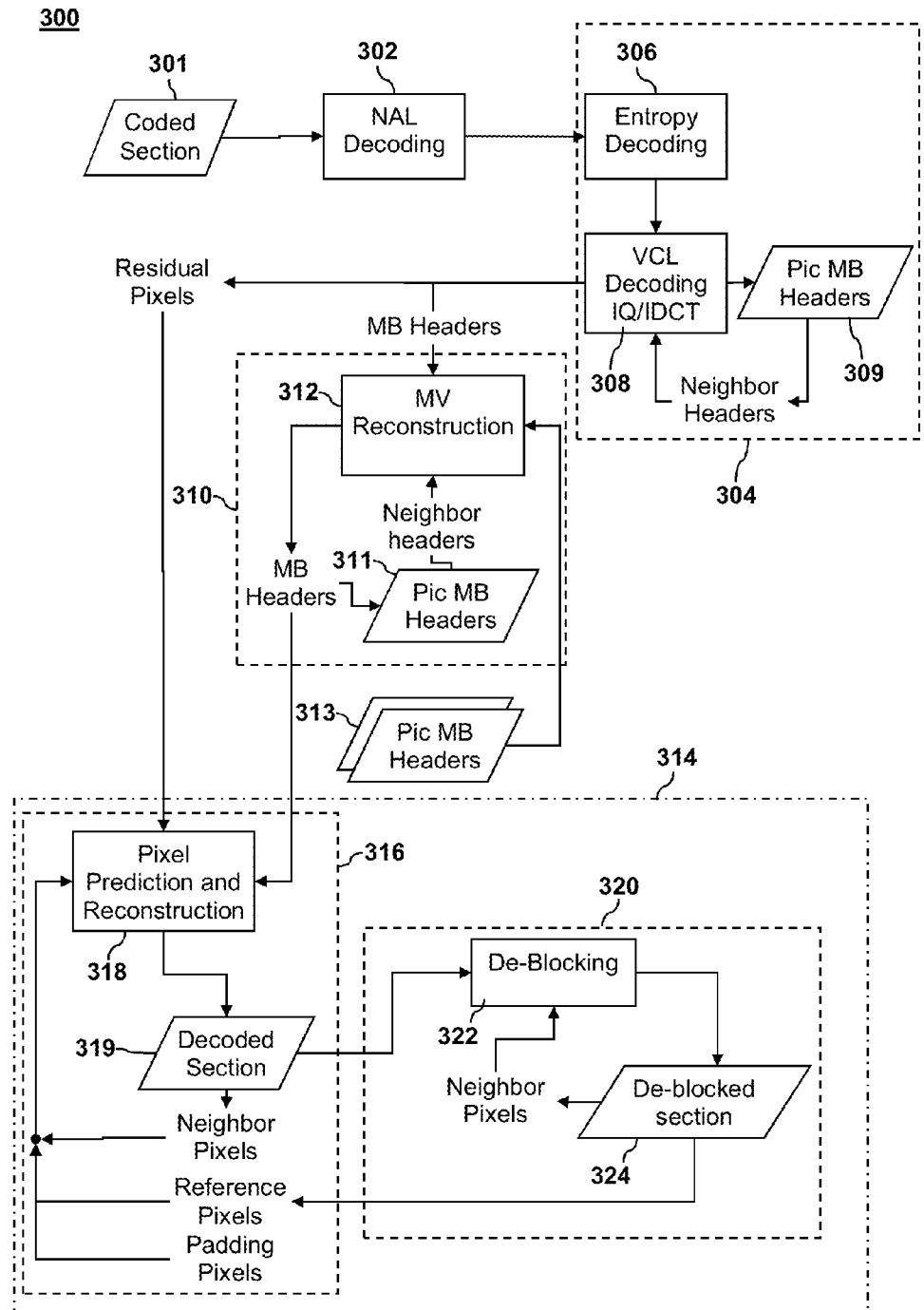
FIG. 3 is a flow diagram illustrating the general process flow in streaming data decoding that may be used in conjunction with aspects of the present disclosure.

FIG. 3 illustrates an example of a possible process flow in a method 300 for decoding of streaming data 301 that may be used in conjunction with aspects of the present disclosure. This particular example shows the process flow for video decoding, e.g., using the AVC (H.264) standard. The coded streaming data 301 may initially be stored in a buffer. Where coded streaming data 301 (e.g., a video data bitstream) has been transferred over a network, e.g., the Internet, the data 301 may initially undergo a process referred to as network abstraction layer (NAL) decoding, indicated at 302. The Network Abstraction Layer (NAL) is a part of streaming data standards, such as the H.264/AVC and HEVC video coding standards. The main goal of the NAL is the provision of a "network-friendly" representation of streaming data for "conversational" (e.g., video telephony) and "non-conversational" (storage, broadcast, or streaming) applications. NAL decoding may remove from the data 301 information added to assist in transmitting the data. Such information, referred to as a "network wrapper" may identify the data 201 as video data or indicate a beginning or end of a bitstream, bits for alignment of data, and/or metadata about the video data itself.

In addition, by way of example, the network wrapper may include information about the data 301 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section. Due to its complexity, NAL decoding is typically done on a picture and slice level. The smallest NAL buffer used for NAL decoding is usually slice sized.

Figure 4:
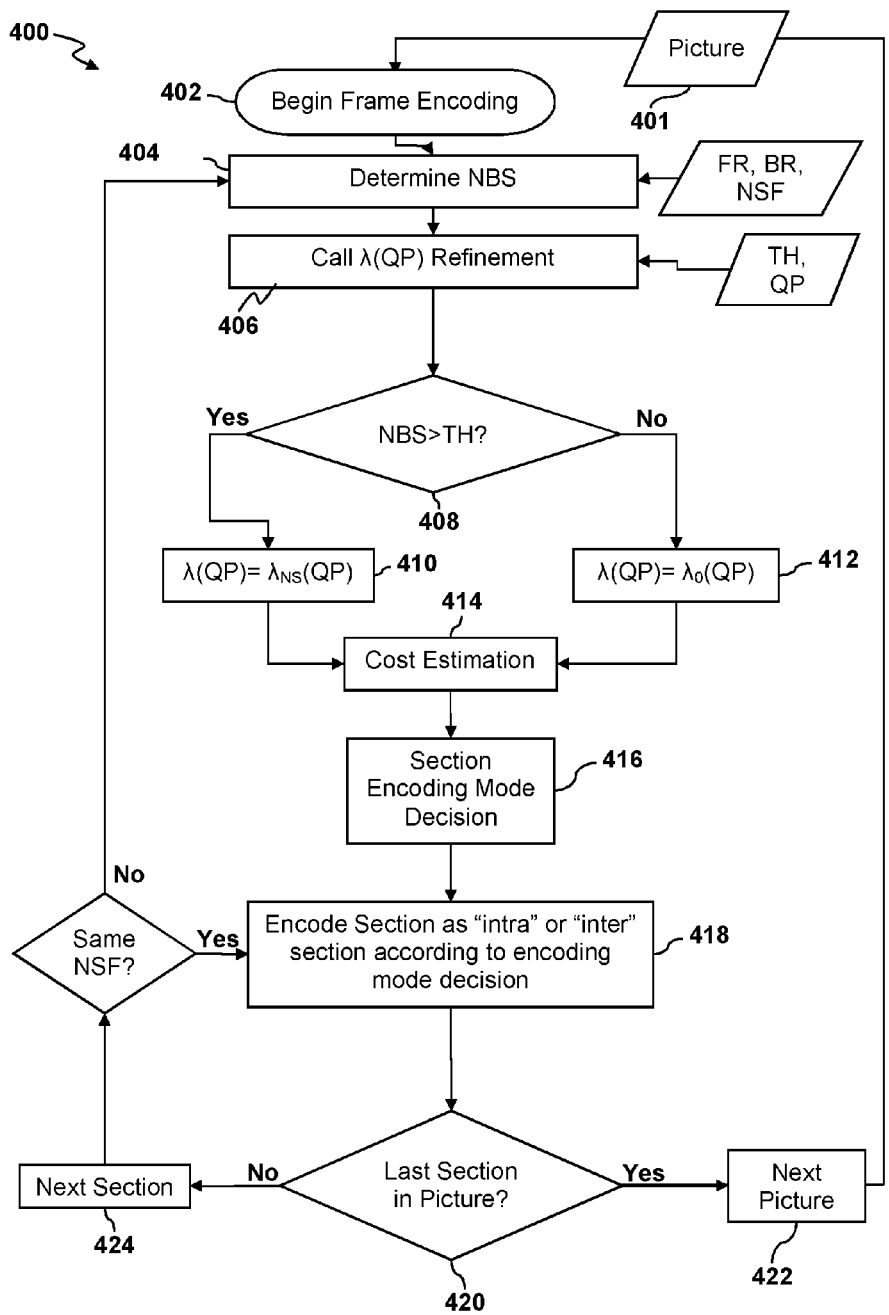
FIG. 4 is a flow diagram illustrating picture quality oriented rate control adjustment according to aspects of the present disclosure.

In some embodiments, after NAL decoding at 302, the remaining decoding illustrated in FIG. 4 may be implemented in three different thread groups or task groups referred to herein as video coded layer (VCL) decoding 304, motion vector (MV) reconstruction 310 and picture reconstruction 314. The picture reconstruction task group 214 may include pixel prediction and reconstruction 316 and post processing 320. In some embodiments of the present invention, these tasks groups may be chosen based on data dependencies such that each task group may complete its processing of all the macroblocks in a picture (e.g., frame or field) or section before the macroblocks are sent to the next task group for subsequent processing.

Certain coding standards may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 304 are typically at the macroblock level for macroblocks within the same slice. Consequently results produced by the VCL decoding process 304 may be buffered at the macroblock level.

VCL decoding 304 often includes a process referred to as Entropy Decoding 306, which is used to decode the VCL syntax. Many codecs, such as AVC(H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC(H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC(H.264) bitstreams. Decoding the entropy layer of AVC(H.264)-coded data streams can be computationally intensive and may present challenges for devices that decode AVC(H.264)-coded bitstreams using general purpose microprocessors. For this reason, many systems use a hardware decoder accelerator.

In addition to Entropy Decoding 306, the VCL decoding process 304 may involve inverse quantization (IQ) and/or inverse discrete cosine transformation (IDCT) as indicated at 308. These processes may decode the headers 309 and data from macroblocks. The decoded headers 309 may be used to assist in VCL decoding of neighboring macroblocks.

VCL decoding 304 may be implemented at a macroblock level data dependency frequency. Specifically, different macroblocks within the same slice may undergo VCL decoding in parallel and the results may be sent to the motion vector reconstruction task group 210 for further processing.

Subsequently, all macroblocks in the picture or section may undergo motion vector reconstruction 310. The MV reconstruction process 310 may involve motion vector reconstruction 312 using headers from a given macroblock 311 and/or co-located macroblock headers 313. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 316 using a process based on residual pixels from the VCL decoding process 304 and motion vectors from the MV reconstruction process 310. The data dependency frequency (and level of parallelism) for the MV depends on whether the MV reconstruction process 310 involves co-located macroblocks from other pictures. For MV reconstruction not involving co-located MB headers from other pictures the MV reconstruction process 310 may be implemented in parallel at the slice level or picture level. For MV reconstruction involving co-located MB headers the data dependency frequency is at the picture level and the MV reconstruction process 310 may be implemented with parallelism at the slice level.

The results of motion vector reconstruction 310 are sent to the picture reconstruction task group 314, which may be parallelized on a picture frequency level. Within the picture reconstruction task group 314 all macroblocks in the picture or section may undergo pixel prediction and reconstruction 316 in conjunction with de-blocking 320. The pixel prediction and reconstruction task 316 and the de-blocking task 320 may be parallelized to enhance the efficiency of decoding. These tasks may be parallelized within the picture reconstruction task group 314 at a macroblock level based on data dependencies. For example, pixel prediction and reconstruction 316 may be performed on one macroblock and followed by de-blocking 320. Reference pixels from the decoded picture obtained by de-blocking 320 may be used in pixel prediction and reconstruction 316 on subsequent macroblocks. Pixel prediction and reconstruction 318 produces decoded sections 319 (e.g. decoded blocks or macroblocks) that include neighbor pixels which may be used as inputs to the pixel prediction and reconstruction process 318 for a subsequent macroblock. The data dependencies for pixel prediction and reconstruction 316 allow for a certain degree of parallel processing at the macroblock level for macroblocks in the same slice.

The post processing task group 320 may include a de-blocking filter 322 that is applied to blocks in the decoded section 319 to improve visual quality and prediction performance by smoothing the sharp edges which can form between blocks when block coding techniques are used. The de-blocking filter 322 may be used to improve the appearance of the resulting de-blocked sections 324.

The decoded section 319 or de-blocked sections 324 may provide neighboring pixels for use in de-blocking a neighboring macroblock. In addition, decoded sections 319 including sections from a currently decoding picture may provide reference pixels for pixel prediction and reconstruction 318 for subsequent macroblocks. It is during this stage that pixels from within the current picture may optionally be used for pixel prediction within that same current picture as described above, independent of whether the picture (or subsections thereof) is inter-coded or intra-coded. De-blocking 320 may be parallelized on a macroblock level for macroblocks in the same picture.

The decoded sections 319 produced before post processing 320 and the post-processed sections 324 may be stored in the same buffer, e.g., the output picture buffer depending on the particular codec involved. It is noted that de-blocking is a post processing filter in H.264. Because H.264 uses pre-de-blocking macroblock as reference for neighboring macroblocks intra prediction and post-de-blocking macroblocks for future picture macroblocks inter prediction. Because both pre- and post-de-blocking pixels are used for prediction, the decoder or encoder has to buffer both pre-de-blocking macroblocks and post-de-blocking macroblocks. For most low cost consumer applications, pre-de-blocked pictures and post-de-blocked pictures share the same buffer to reduce memory usage. For standards that pre-date H.264, such as MPEG2 or MPEG4 except MPEG4 part 10, (note: H.264 is also called MPEG4 part 10), only pre-post-processing macroblocks (e.g., pre-de-blocking macroblocks) are used as reference for other macroblock prediction. In such codecs, a pre-filtered picture may not share the same buffer with a post filtered picture.

Thus, for H.264, after pixel decoding, the decoded section 319 is saved in the output picture buffer. Later, the post processed sections 324 replace the decoded sections 319 in the output picture buffer. For non-H.264 cases, the decoder only saves decoded sections 319 in the output picture buffer. The post processing is done at display time and the post processing output may not share the same buffer as the decoder output picture buffer.

Adaptive Picture Subsection Encoding Mode Decision Control

FIG. 4 illustrates an algorithm 400 for implementing a method for picture section encoding mode decision control according to aspects of the present disclosure. In the illustrated example, when a new picture 401 (e.g., a video frame) is received for encoding as indicated at 402 the picture may be analyzed to determine a target number of bits per section (NBS) for that picture or for one or more sections within the picture, as indicated at 404. By way of example, and not by way of limitation NBS may be determined from the frame rate FR, the target bitrate BR, and the number of sections for the frame NSF, as discussed above.

In the algorithm 400 a relationship $\lambda(QP)$ between Lagrange parameter $\lambda$ and quantization parameter QP used in cost estimation for a section encoding mode decision can be adjusted depending on NBS. By way of example, and not by way of limitation, the different relationships may be stored in different tables in a memory. A routine for adjusting the relationship between $\lambda$ and QP may then be called, as indicated at 406. The adjusting routine compares NBS to a threshold TH, as indicated at 408. If NBS is greater than TH, a non-default relationship $\lambda_{NS}(QP)$ is selected, as indicated at 410, otherwise, a default relationship is used for cost estimation, as indicated at 412.

The selected form of the relationship $\lambda(QP)$ is used in estimating a cost J for encoding the section, as indicated at 414. By way of example, and not by way of limitation, the cost J may be estimated by adding a reconstruction distortion of the section to a product of a $\lambda$ value for the section (determined from a QP value and the selected form of the selected form of $\lambda(QP)$) and actual bit consumption for encoding the overhead of the section. An example of such cost estimation is discussed above. Those skilled in the art of digital streaming data encoding will be aware of or will be able to devise other form of cost estimation that can be used in accordance with aspects of the present disclosure. The resulting cost estimation is used in a section encoding mode decision, as indicated at 416. By way of example, and not by way of limitation, the encoding mode decision may be made by comparing the estimated cost for inter-mode coding to the estimated cost for intra-mode coding. The section may then be encoded as either an "intra" section or an "inter" section according to the decision, as indicated at 418.

If, at 420, the section is the last section in the picture 401 the algorithm may process the next picture, as indicated at 422. Otherwise, the next section may be processed, as indicated at 424. If the next section is the same size as the section that was just encoded, the cost estimation at 414b may use the same relationship λ(QP) that was used previously. Otherwise, the λ(QP) refinement routine may be called at 406.

Figure 5:
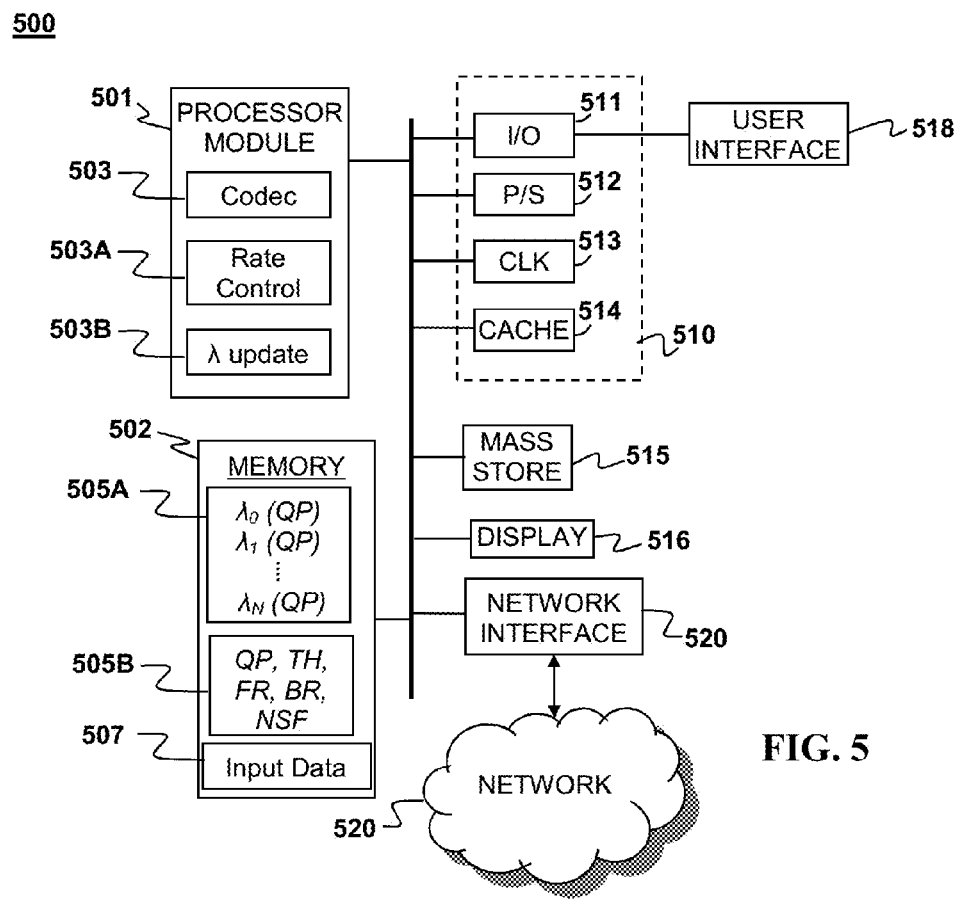
FIG. 5 is a block diagram illustrating an apparatus for encoding and/or decoding a digital picture configured to implement picture quality oriented rate control adjustment according to aspects of the present disclosure.

Aspects of the present disclosure also include systems configured to implement adaptive picture section encoding mode decision control in conjunction with encoding of digital pictures, as described above. By way of example, and not by way of limitation, FIG. 5 illustrates a block diagram of a computer system 500 that may be used to implement aspects of the present disclosure. The system 500 generally may include a processor module 501 and a memory 502. The processor module 501 may include one or more processor cores, e.g., in single core, dual core, quad core, processor-coprocessor, CPU-GPU, or Cell processor architectures.

The memory 502 may be in the form of an integrated circuit, e.g., RAM, DRAM, ROM, and the like. The memory may also be a main memory that is accessible by all of the processor cores in the processor module 501. In some embodiments, the processor module 501 may have local memories associated with one or more processor cores or one or more co-processors. A codec program 503 may be stored in the main memory 502 in the form of processor readable instructions that can be executed on the processor module 501. The codec 503 may be configured to encode digital pictures. By way of example, and not by way of limitation, the codec 503 may be configured to encode digital pictures or sections of digital pictures as discussed above with respect to FIG. 2A. The codec 503 may also be configured to decode encoded digital pictures, e.g., as described above with respect to FIG. 3. A rate control program 503A may implement rate control by deriving QP, as described with respect to FIGS. 2C-2D. An encoding mode decision routine 503B may adjust the relationship between Lagrange parameters λ and QP to implement picture section encoding mode decision control, as described above with respect to FIG. 4. The codec 503 and Rate Controller 503A and encoding mode decision routine 503B may be written in any suitable processor readable language, e.g., C, C++, JAVA, Assembly, MATLAB, FORTRAN and a number of other languages.

Input or output data 507 may be stored in memory 502. During execution of the codec 503, rate controller 503A, and/or encoding mode decision routine 503B, portions of program code, parameters 505A, 505B and/or data 507 may be loaded into the memory 502 or the local stores of processor cores for processing by the processor 501. By way of example, and not by way of limitation, the input data 507 may include video pictures, or sections thereof, before encoding or decoding or at intermediate stages of encoding or decoding. In the case of encoding, the data 507 may include buffered portions of streaming data, e.g., unencoded video pictures or portions thereof. In the case of decoding, the data 507 may include input data in the form of un-decoded sections, sections that have been decoded, but not post-processed and sections that have been decoded and post-processed. Such input data may include data packets containing data representing one or more coded sections of one or more digital pictures. By way of example, and not by way of limitation, such data packets may include a set of transform coefficients and a partial set of prediction parameters. These various sections may be stored in one or more buffers. In particular, decoded and/or post processed sections may be stored in an output picture buffer implemented in the memory 502.

The parameters 505A, 505B include adjustable parameters 505A, such as multiple different λ(QP) relationships. These relationships may include a default relationship $\lambda_0(QP)$ and one or more non-default relationships $\lambda_1(QP) \ldots \lambda_N(QP)$ which may be stored in the memory 502, e.g., as corresponding tables. The parameters 505A, 505B may also include fixed parameters 505B, such as the threshold TH, QP values, frame rate FR, target bitrate BR, and number of sections per frame NSF that remain fixed during the encoding of a picture or over the course of encoding multiple pictures. In some implementations, the number of sections per frame NSF might vary during encoding of a picture.

The system 500 may also include well-known support functions 510, such as input/output (I/O) elements 511, power supplies (P/S) 512, a clock (CLK) 513 and cache 514. The apparatus 500 may optionally include a mass storage device 515 such as a disk drive, CD-ROM drive, tape drive, or the like to store programs and/or data. The device 800 may also optionally include a display unit 516 and user interface unit 518 to facilitate interaction between the apparatus 500 and a user. The display unit 516 may be in the form of a cathode ray tube (CRT) or flat panel screen that displays text, numerals, graphical symbols or images. The user interface 518 may include a keyboard, mouse, joystick, light pen, or other device that may be used in conjunction with a graphical user interface (GUI). The apparatus 500 may also include a network interface 520 to enable the device to communicate with other devices over a network 522, such as the internet. These components may be implemented in hardware, software, or firmware, or some combination of two or more of these.

By way of example, and not by way of limitation, the system 500 may transmit encoded or unencoded streaming data to other devices connected to the network 522 or receive encoded or unencoded streaming date from such devices via the network interface 520. In a particular implementation, encoded streaming data in the form of one or more encoded sections of a digital picture and/or one or more frames of encoded video may be transmitted from the system over the network 522. To implement transmitting or receiving streaming data, the processor module may execute instructions implementing a network protocol stack.

By way of example, and not by way of limitation, digital pictures may be generated with a digital camera, which may be part of the user interface 518 or which may be a separate peripheral coupled to the system 500, e.g., via the I/O elements 511. According to some aspects, the digital pictures may be generated by a software application executed by the processor module 501.

Figure 6:
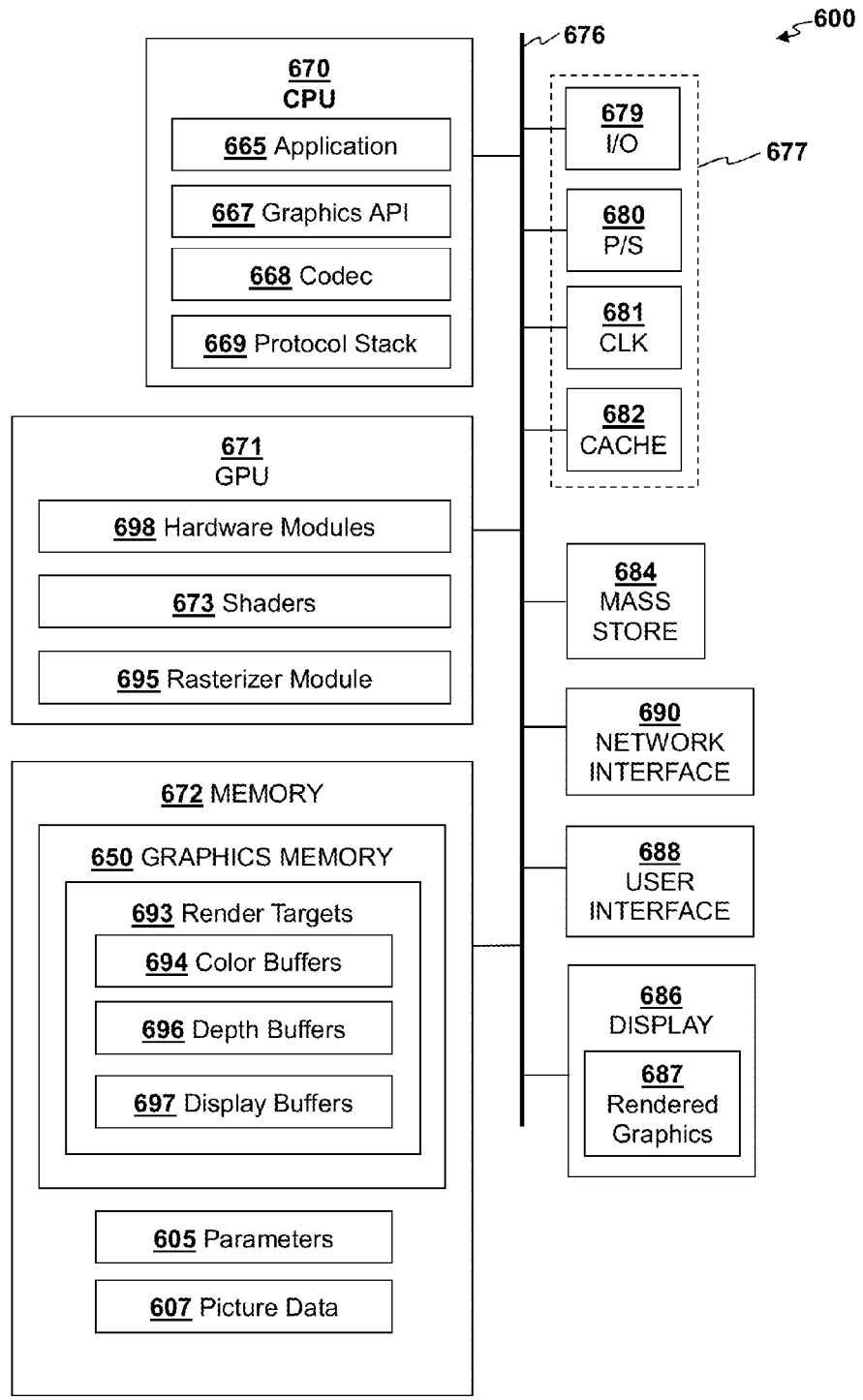
FIG. 6 is a schematic diagram depicting a graphics rendering system according to aspects of the present disclosure.

FIG. 6 illustrates an example of a computing system 600 that is configured to generate, encode, and transmit digital pictures in accordance with aspects of the present disclosure. The system 600 may be configured to render graphics for an application 665 with in accordance with aspects described above. According to aspects of the present disclosure, the system 600 may be an embedded system, mobile phone, personal computer, tablet computer, portable game device, workstation, game console, and the like.

The system 600 may generally include a processor module and a memory configured to implemented aspects of the present disclosure, e.g., by generating digital pictures, encoding the digital pictures by performing a method having features in common with the method of FIG. 4, and transmitting the encoded pictures over a network. In the illustrated example, the processor module may include a central processing unit (CPU) 670, a graphics processing unit (GPU) 671, and a memory 672. The memory 672 may optionally include a main memory unit that is accessible to both the CPU and GPU, and portions of the main memory may optionally include portions of the graphics memory 650. The CPU 670 and GPU 671 may each include one or more processor cores, e.g., a single core, two cores, four cores, eight cores, or more.

The CPU 670 and GPU 671 may be configured to access one or more memory units using a data bus 676, and, in some implementations, it may be useful for the system 600 to include two or more different buses.

The memory 672 may include one or more memory units in the form of integrated circuits that provides addressable memory, e.g., RAM, DRAM, and the like. The graphics memory 650 may temporarily store graphics resources, graphics buffers, and other graphics data for a graphics rendering pipeline. The graphics buffers may include, e.g., one or more vertex buffers for storing vertex parameter values and one or more index buffers for storing vertex indices. The graphics buffers may also include a one or more render targets 693, which may include both color buffers 694 and depth buffers 696 holding pixel/sample values computed as a result of execution of instructions by the CPU 670 and GPU 671. In certain implementations, the color buffers 694 and/or depth buffers 696 may be used to determine a final array of display pixel color values to be stored in a display buffer 697, which may make up a final rendered image intended for presentation on a display. In certain implementations, the display buffer may include a front buffer and one or more back buffers, and the GPU 671 may be configured to scanout graphics frames from the front buffer of the display buffer 697 for presentation on a display 686.

The CPU may be configured to execute CPU code, which may include an application 665 that utilizes rendered graphics (such as a video game) and a corresponding graphics API 667 for issuing draw commands or draw calls to programs implemented by the GPU 671 based on the state of the application 665. The CPU code may also implement physics simulations and other functions.

To support the rendering of graphics, the GPU may execute shaders 673, which may include vertex shaders and pixel shaders. The GPU may also execute other shader programs, such as, e.g., geometry shaders, tessellation shaders, compute shaders, and the like. The GPU may also include specialized hardware modules 698, which may include one or more texture mapping units and/or other hardware modules configured to implement operations at one or more stages of a graphics pipeline, which may be fixed function operations. The shaders 673 and hardware modules 698 may interface with data in the memory 650 and the buffers 693 at various stages in the pipeline before the final pixel values are output to a display. The GPU may include a rasterizer module 695, which may be optionally embodied in a hardware module 698 of the GPU, a shader 673, or a combination thereof. The rasterization module 695 may be configured take multiple samples of primitives for screen space pixels and invoke one or more pixel shaders according to the nature of the samples, in accordance with aspects of the present disclosure.

The system 600 may also include well-known support functions 677, which may communicate with other components of the system, e.g., via the bus 676. Such support functions may include, but are not limited to, input/output (I/O) elements 679, power supplies (P/S) 680, a clock (CLK) 681, and a cache 682. The apparatus 600 may optionally include a mass storage device 684 such as a disk drive, CD-ROM drive, flash memory, tape drive, Blu-ray drive, or the like to store programs and/or data. The device 600 may also include a display unit 686 to present rendered graphics 687 to a user and user interface unit 688 to facilitate interaction between the apparatus 600 and a user. The display unit 686 may be in the form of a flat panel display, cathode ray tube (CRT) screen, touch screen, head mounted display (HMD) or other device that can display text, numerals, graphical symbols, or images. The display 686 may display rendered graphics 687 processed in accordance with various techniques described herein. The user interface 688 may one or more peripherals, such as a keyboard, mouse, joystick, light pen, game controller, touch screen, and/or other device that may be used in conjunction with a graphical user interface (GUI). In certain implementations, the state of the application 660 and the underlying content of the graphics may be determined at least in part by user input through the user interface 688, e.g., in video gaming implementations where the application 665 includes a video game.

The system 600 may also include a network interface 690 to enable the device to communicate with other devices over a network. The network may be, e.g., a local area network (LAN), a wide area network such as the internet, a personal area network, such as a Bluetooth network or other type of network. Various ones of the components shown and described may be implemented in hardware, software, or firmware, or some combination of two or more of these. The CPU code may include a codec 668 configured to encode digital pictures generated by the GPU. By way of example, and not by way of limitation, the codec 668 may be configured to encode digital pictures or sections of digital pictures as discussed above with respect to FIGS. 2A, implement rate control by deriving QP, as described with respect to FIGS. 2B-2C, and adjust QP to implement picture quality oriented rate control, as described above with respect to FIG. 4. The codec 668 may also be configured to decode encoded digital pictures, e.g., as described above with respect to FIG. 3. The CPU code may also include a network protocol stack 669 configured to allow the system 600 to transmit the resulting encoded pictures or encoded sections over the network via the network interface 690.

The memory 672 may store parameters 605 and/or picture data 607 or other data. During execution of programs, such as the application 665, graphics API 667, or codec 668, portions of program code, parameters 605 and/or data 607 may be loaded into the memory 672 or cache 682 for processing by the CPU 670 and/or GPU 671. By way of example, and not by way of limitation, the picture data 607 may include data corresponding video pictures, or sections thereof, before encoding or decoding or at intermediate stages of encoding or decoding. In the case of encoding, the picture data 607 may include buffered portions of streaming data, e.g., unencoded video pictures or portions thereof. In the case of decoding, the data 607 may include input data in the form of un-decoded sections, sections that have been decoded, but not post-processed and sections that have been decoded and post-processed. Such input data may include data packets containing data representing one or more coded sections of one or more digital pictures. By way of example, and not by way of limitation, such data packets may include a set of transform coefficients and a partial set of prediction parameters. These various sections may be stored in one or more buffers. In particular, decoded and/or post processed sections may be stored in an output buffer, which may be implemented in the memory 672. The parameters 605 may include adjustable parameters and/or fixed parameters, as discussed above.

Programs implemented by the CPU and/or GPU (e.g., CPU code, GPU code, application 665, graphics API 667, codec 668, protocol stack 669, and shaders 673) may be stored as executable or compilable instructions in a non-transitory computer readable medium, e.g., a volatile memory, (e.g., RAM) such as the memory 672, the graphics memory 650, or a non-volatile storage device (e.g., ROM, CD-ROM, disk drive, flash memory).

Aspects of the present disclosure provide for cost estimation for section encoding mode decision that is adaptive to the bitrate and video resolution. Conventional codecs, by contrast, use a fix/unchangeable lambda value for all bitrate and video resolution cases. According to aspects of the present disclosure, the lambda value is changeable at any point of frame encode,(e.g., at the beginning of encode process, or the starting point of a frame encode).

Experimental Results

Experiments have been performed using encoding mode decision control in accordance with aspects of the present disclosure. Use of non-default $\lambda$(QP) relationships can reduce the percentage of sections that are "intra" coded for different frames in a video sequence. In one particular experiment, a sequence of 720 p video frames was encoded using four different times, each time with a different $\lambda$(QP) relationship. The 4QP) relationships included the default relationship $\lambda_0$ for the H.264 coding default that was described above and the alternative relationships $\lambda_1$, $\lambda_2$, and $\lambda_3$, which were also described above. Each 720 p frame was 1280 pixels wide by 720 pixels high and made up of 3600 16 pixel×16 pixel macroblocks. When the default relationship $\lambda_0$ was used to determine the cost function for the encoding mode decision about 70% of the macroblocks in most of the frames of the video sequence were encoded as "intra" macroblocks. When the relationship $\lambda_1$ was used, less than 30% of the macroblocks in most of the frames of the same video sequence were encoded as "intra" macroblocks. When the relationship $\lambda_2$ was used, less than 20% of the macroblocks in most frames of the same video sequence were encoded as "intra" macroblocks. When the relationship $\lambda_3$ was used, less than 10% of the macroblocks in most frames of the same video sequence were encoded as "intra" macroblocks. The peak signal to noise ratio between the original images and the images that resulted from decoding the encoded pictures was about 49.3 dB for images encoded using the default relationship $\lambda_0$, about 49.1 for images encoded using alternative relationship $\lambda_1$, about 48.9 for images encoded using alternative relationship $\lambda_2$, and about 48.7 for images encoded using alternative relationship $\lambda_3$. These slight differences in image quality were not visually perceptible. On average, the bit usage was about 2.4% higher for pictures encoded using the alternative relationships $\lambda_1$, $\lambda_2$, and $\lambda_3$ compared to encoding the same pictures using the default relationship $\lambda_0$.

In another experiment, a sequence of 540 p video frames was encoded using four different times, once using the default relationship $\lambda_0$ for the H.264 coding standard and also using the alternative relationships $\lambda_1$, $\lambda_2$, and $\lambda_3$. When the default relationship $\lambda_0$ was used to determine the cost function for the encoding mode decision an average of about 57% of the macroblocks per frame were encoded as "intra" macroblocks. However, there were significant spikes to over 90% for certain frames. When the relationship $\lambda_1$ was used, an average of 43% of the macroblocks per frame were encoded as "intra" macroblocks with a few frames exceeding 60% and none exceeding 70%. When the relationship $\lambda_2$ was used, an average of 33% of the macroblocks per frame were encoded as "intra" macroblocks with a few frames exceeding 50% and none exceeding about 55%. When the relationship $\lambda_3$ was used, an average of 21% of the macroblocks per frame were encoded as "intra" macroblocks with a few frames exceeding 40% and none exceeding about 45%. The peak signal to noise ratio between the original images and the images that resulted from decoding the encoded pictures was about 49.3 dB for images encoded using the default relationship $\lambda_0$, about 49.1 for images encoded using alternative relationship $\lambda_1$, about 48.9 for images encoded using alternative relationship $\lambda_2$, and about 48.7 for images encoded using alternative relationship $\lambda_3$. These slight differences in image quality were not visually perceptible. On average, the bit usage was about 2.0-2.3% higher for pictures encoded using the alternative relationships $\lambda_1$, $\lambda_2$, and $\lambda_3$ compared to encoding the same pictures using the default relationship $\lambda_0$.

The peak signal to noise ratio between the original images and the images that resulted from decoding the encoded pictures was about 46.8 dB for images encoded using the default relationship $\lambda_0$, about 46.5 for images encoded using alternative relationships $\lambda_1$ and $\lambda_2$, and about 46.3 for images encoded using alternative relationship $\lambda_3$. These slight differences in image quality were not visually perceptible.

The results of these experiments show that changing the $\lambda$(QP) relationship in the manner described herein can reduce the percentage of sections in a picture that are encoded as "intra" sections. As noted above, reducing the number of "intra" coded sections (e.g., macroblocks) in a picture reduces the likelihood of unnecessary scene change detection and IDR insertion. Changing the $\lambda$(QP) relationship in the manner described herein is therefore effective in controlling the picture section encoding mode in a way that reduces potentially unnecessary IDR insertion in video streaming and game streaming. The above-described experiments also demonstrate that changing the $\lambda$(QP) relationship in encoding digital pictures as described herein does not perceptibly degrade the image quality of the images obtained from decoding the resulting encoded images or significantly increase bit usage.

Aspects of the present disclosure may be incorporated into systems that produce or receive unencoded digital pictures, encode them for transmission over a network, and transmit them over the network.

In addition, aspects of the present disclosure are not limited to streaming applications or other application that involve encoding of pictures for transmission over a network. Aspects of the present disclosure are also applicable to other video applications, for example non-real-time video encoding, such as content production, or encoding for storage on media, e.g., in camcorders.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method, comprising:
   determining a cost function for use in an encoding mode decision for encoding a section of a digital picture, wherein determining the cost function includes using a non-default relationship between Lagrange multiplier ($\lambda$) values and quantization parameter (QP) values to determine the cost function when a number of bits per section (NBS) of the digital picture is in a predetermined range and using default relationship between the $\lambda$ values and the QP values to determine the cost function otherwise, wherein one or more $\lambda$ values in the non-default relationship are equal to corresponding $\lambda$ values in the default relationship and one or more other $\lambda$ values in the non-default relationship are unequal to corresponding λ values in the default relationship;
using the determined cost function to make the encoding mode decision;
encoding the section according to the encoding mode decision.

2. The method of claim 1, wherein the NBS of the digital picture is determined for each of two or more sections of different size in the digital picture.

3. The method of claim 1, wherein all sections in the digital picture that are to be encoded have same size and the same NBS of the digital picture is determined at the beginning of encoding of the digital picture.

4. The method of claim 1, further comprising, deriving a QP value for the section of the digital picture.

5. The method of claim 1, further comprising, receiving a QP value for the section of the digital picture.

6. The method of claim 1, wherein determining the cost function includes computing a reconstruction distortion of the section and a product of a λ value for the section and an actual bit consumption for encoding the overheard of the section.

7. The method of claim 1, wherein determining the cost function includes adding a reconstruction distortion of the section to a product of a λ value for the section and an actual bit consumption for encoding the overhead of the section.

8. The method of claim 1, wherein the non-default relationship between the λ values and the QP values is one in which some of the λ values for selected QP values are higher than for corresponding λ values in the default relationship.

9. The method of claim 1, wherein the QP values in the default relationship and the QP values in the non-default relationship are in a range from 0 to 51.

10. The method of claim 1, wherein the QP values in the default relationship and the QP values in the non-default relationship are in a range from 0 to 51 and wherein λ values corresponding to QP values between about 12 and about 20 are higher in the non-default relationship than in the default relationship.

11. The method of claim 1, wherein the QP values in the default relationship and the QP values in the non-default relationship are in a range from 0 to 51 and wherein λ values corresponding to QP values between about 12 and about 22 are higher in the non-default relationship than in the default relationship.

12. The method of claim 1, wherein the QP values in the default relationship and the QP values in the non-default relationship are in a range from 0 to 51 and wherein λ values corresponding to QP values between about 12 and about 24 are higher in the non-default relationship than in the default relationship.

13. The method of claim 1, wherein the QP values in the default relationship and the QP values in the non-default relationship are in a range from 0 to 31.

14. The method of claim 1, wherein the λ values in the non-default relationship are equal to corresponding λ values in the default relationship over one or more ranges of QP values and unequal to corresponding λ values in the default relationship over one or more other ranges of QP values.

15. The method of claim 1, further comprising transmitting the encoded section over a network.

16. The method of claim 1, further comprising using the encoded section in non-real-time video encoding.

17. A system, comprising:
a processor module;
a memory coupled to the processor, wherein the memory contains executable instructions configured to implement a method, the method comprising:
determining a cost function for use in an encoding mode decision for encoding a section of a digital picture, wherein determining the cost function includes using a non-default relationship between Lagrange multiplier (λ) values and quantization parameter (QP) values to determine the cost function when a number of bits per section (NBS) of the digital picture is in a predetermined range and using default relationship between the λ values and the QP values to determine the cost function otherwise, wherein one or more λ values in the non-default relationship are equal to corresponding λ values in the default relationship and one or more other λ values in the non-default relationship are unequal to corresponding λ values in the default relationship;
using the determined cost function to make section encoding mode decision;
encoding a section of the digital picture according to encoding mode decision.

18. The system of claim 17, wherein the non-default relationship between the λ values and the QP values is one in which some of the λ values for selected QP values are higher than for corresponding λ values in the default relationship.

19. The system of claim 16, wherein the QP values in the default relationship and the QP values in the non-default relationship are in a range from 0 to 51.

20. The system of claim 17, wherein the QP values in the default relationship and the QP values in the non-default relationship are in a range from 0 to 51 and wherein λ values corresponding to QP values between about 12 and about 20 are higher in the non-default relationship than in the default relationship.

21. The system of claim 17, wherein the QP values in the default relationship and the QP values in the non-default relationship are in a range from 0 to 51 and wherein λ values corresponding to QP values between about 12 and about 22 are higher in the non-default relationship than in the default relationship.

22. The system of claim 17, wherein the QP values in the default relationship and the QP values in the non-default relationship are in a range from 0 to 51 and wherein λ values corresponding to QP values between about 12 and about 24 are higher in the non-default relationship than in the default relationship.

23. The system of claim 17, wherein the QP values in the default relationship and the QP values in the non-default relationship are in a range from 0 to 31.

24. The system of claim 17, wherein the λ values in the non-default relationship are equal to corresponding λ values in the default relationship over one or more ranges of QP values and unequal to corresponding λ values in the default relationship over one or more other ranges of QP values.

25. The system of claim 17, further comprising a network interface configured to transmit the encoded section over a network.

26. A non-transitory computer readable medium having embodied therein computer readable instructions configured, to implement a method, the method comprising:
determining a cost function for use in an encoding mode decision for encoding a section of a digital picture, wherein determining the cost function includes using a non-default relationship between Lagrange multiplier (λ) values and quantization parameter (QP) values to determine the cost function when a number of bits per section (NBS) of the digital picture is in a predetermined range and using default relationship between the λ values and the QP values to determine the cost function otherwise, wherein one or more λ values in the non-default relationship are equal to corresponding λ values in the default relationship and one or more other λ values in the non-default relationship are unequal to corresponding λ values in the default relationship;

using the determined cost function to make section encoding mode decision;

encoding a section of the digital picture according to encoding mode decision.

* * * * *